United States Patent [19]
Patchen et al.

[11] Patent Number: 5,748,981
[45] Date of Patent: May 5, 1998

[54] MICROCONTROLLER WITH IN-CIRCUIT USER PROGRAMMABLE MICROCODE

[75] Inventors: Paul J. Patchen; Hon C. Fung, both of Arlington, Tex.; Fred Leung, Cupertino; Steven McGinness, San Jose, both of Calif.

[73] Assignee: National Semiconductor Corporation, Santa Clara, Calif.

[21] Appl. No.: 748,970

[22] Filed: Nov. 13, 1996

Related U.S. Application Data

[63] Continuation of Ser. No. 454,427, May 30, 1995, abandoned, which is a continuation of Ser. No. 963,782, Oct. 20, 1992, abandoned.

[51] Int. Cl.⁶ ............................................. G06F 9/00
[52] U.S. Cl. ............................................. 395/828; 395/712
[58] Field of Search ........................ 395/800.29, 800.23, 395/828, 830, 834, 835, 839, 840, 882, 887, 893, 284, 700, 429, 431, 438, 182.03, 500, 712

[56] References Cited

U.S. PATENT DOCUMENTS

| | | | |
|---|---|---|---|
| 3,377,624 | 4/1968 | Nelson et al. | 395/425 |
| 3,757,306 | 9/1973 | Boone | 340/172.5 |
| 4,074,351 | 2/1978 | Boone | 364/200 |
| 4,490,783 | 12/1984 | McDonough et al. | 395/775 |
| 5,088,023 | 2/1992 | Nakamura et al. | 395/425 |
| 5,097,506 | 3/1992 | Kaiser, Jr. et al. | 380/25 |
| 5,109,521 | 4/1992 | Culley | 395/800 |
| 5,179,689 | 1/1993 | Leach et al. | 395/425 |
| 5,179,694 | 1/1993 | Keida et al. | 395/550 |
| 5,220,522 | 6/1993 | Wilson et al. | 364/709.04 |
| 5,261,114 | 11/1993 | Raasch et al. | 395/800 |
| 5,261,116 | 11/1993 | Agrawal | 395/800 |
| 5,276,824 | 1/1994 | Skrukak et al. | 395/375 |
| 5,305,460 | 4/1994 | Kaneko et al. | 395/775 |
| 5,459,462 | 10/1995 | Venkidu et al. | 341/22 |
| 5,491,495 | 2/1996 | Ward et al. | 345/173 |

OTHER PUBLICATIONS

Intel Corporation 1992 Peripheral Components Databook, pp. 5–68 through 5–87, Oct. 1991.

Primary Examiner—Alpesh M. Shah
Attorney, Agent, or Firm—Limbach & Limbach L.L.P.

[57] ABSTRACT

An architecture is described for a single chip microcontroller wherein the microcode stored in the microcontroller's program memory may be easily modified without refabrication or removal of the microcontroller from its target environment. This is made possible by the utilization of a RAM based architecture for program memory instead of the traditional ROM based architecture.

10 Claims, 1 Drawing Sheet

MICROCONTROLLER WITH IN-CIRCUIT USER PROGRAMMABLE MICROCODE

This is a continuation of application Ser. No. 08/454,427 filed on May 30, 1995 now abandoned, which was a file wrapper continuation application of application Ser. No. 07/963,782 filed on Oct. 20, 1992, now abandoned.

BACKGROUND OF THE INVENTION

This invention relates to an architecture for a single-chip microcontroller which enables the end user to modify the microcontroller's microcode program without removing the microcontroller chip from its target environment.

Microcontroller based systems appear in a wide variety of applications. In the past, microcontrollers, as well as microprocessors and similar devices, have almost universally relied upon on-board read-only-memory (ROM) for storage of the microcode program governing the microcontroller's operation. U.S. Pat. No. 3,757,306 and U.S. Pat. No. 4,074,351, the "Boone patents", are examples of the reliance of the prior art on ROM based program memory.

The '306 Boone patent discloses a central processing unit (CPU) which utilizes an external ROM device for storing its control program and subroutines. The '351 Boone patent discloses a monolithic variable function calculator which utilizes a fixed program memory array, such as a programmable ROM, for storing various control programs which determined the desired functions of the calculator.

In a ROM based program memory architecture in a single-chip microcontroller, the microcode is encoded permanently into the microcontroller's memory at the time of fabrication. This "hard wiring" of the program makes it extremely difficult to reprogram the microcontroller in the event that the user wishes to change its application. To reprogram a microcontroller with a ROM based architecture it is necessary to remove the device from its target environment and fabricate a new microcontroller with one or more new masks. It is apparent that it is both costly and inefficient to proceed in this manner each time a change needs to be made in a microcontroller's program to accommodate a change in the intended application of the device. Thus, there have been several attempts to find a solution to this problem with varying degrees of success.

One such solution involves a procedure known as One Time Programming (OTP). As the name suggests, OTP allows a one time downloading of the program code after the device has been fabricated using a special programming device. However, this approach still requires that the microcontroller be programmed outside of its target environment and the issue of reprogrammability is not addressed.

Another solution involves the use of different types of erasable programmable ROMs (EPROMs). These devices may be programmed with a special programming device external to the microcontroller's target environment in much the same way as One Time Programming. The advantage over OTP is that the programs stored in EPROMs may be erased and replaced by new code. Code erasure is accomplished differently, depending upon which type of EPROM is employed. One type of EPROM uses ultraviolet light to erase the undesired code. Typically, the device is exposed to the UV through a window in the top of its package. Another type of EPROM uses the application of certain voltage levels to erase the undesired code. In either case, once the previous code has been erased, a new code may be downloaded using the external programming device.

While EPROMs represent an advantage over OTP in terms of system flexibility, their programming usually requires removal from the target environment and the use of an external programming device. Neither approach affords the user the flexibility of the present invention.

From the foregoing, it becomes apparent that there exists a need for a microcontroller architecture in which the program code may be modified in the target environment by the end user. The present invention addresses and fills that need.

SUMMARY OF THE INVENTION

This invention utilizes a RAM based architecture for storing the program microcode in a single chip microcontroller instead of the ROM based architecture described above. The reprogrammable RAM based architecture greatly increases the flexibility of the microcontroller's application because the user can modify and download the microcontroller program without removing the microcontroller from its target environment. The user can even modify the microcode "on the fly" if necessary.

The invention also reduces costs in a number of ways. If the need for program code modifications is unexpected but unavoidable, the changes can be achieved with minimal disruption to the target environment. The microcontroller can simply be reprogrammed for new applications without the costly replacement of hardware or the down time associated with reprogramming other microcontroller architectures. Furthermore, the invention's flexibility provides an easy avenue for future product differentiation without major system overhauls. The invention is also compatible with environments which use OTP.

Accordingly, this invention allows a system user to modify and download a microcontroller's microcode program while the microcontroller remains in its target environment. Furthermore, the invention reduces the costs associated with changing a microcontroller's application after it has been incorporated into its target environment. The invention also facilitates future product differentiation with little or no hardware modification.

Thus, the invention is a general purpose microcontroller architecture which utilizes a RAM based program memory for storing the microcode program which controls the microcontroller's operation.

DESCRIPTION OF THE SPECIFIC EMBODIMENT(S)

Figure 1:
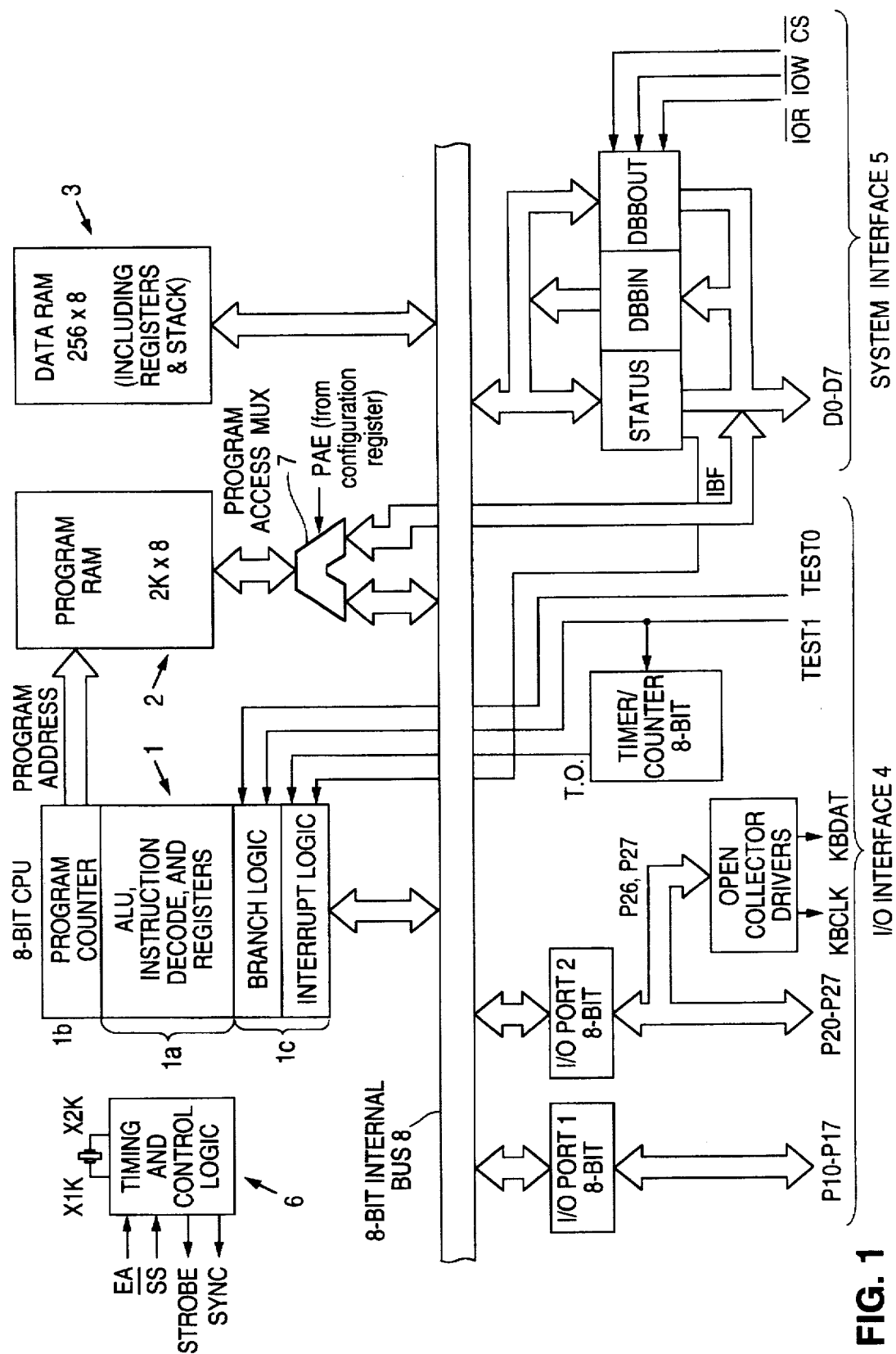
FIG. 1 is a functional block diagram of the keyboard controller embodiment of the present invention.

The invention is suitable for any microcontroller or microprocessor application. FIG. 1 is a functional block diagram of a preferred embodiment of the invention, a keyboard controller for use in a personal computer (PC) environment. The keyboard controller is a general purpose 8-bit microcontroller, the main component of which is an 8-bit central processing unit (CPU) 1. The CPU in turn contains an arithmetic logic unit (ALU) 1a, an 11-bit program counter 1b, various registers 1a, and branch and interrupt logic circuitry 1c. The CPU is interconnected with the remaining components of the keyboard controller by means of an 8-bit internal bus 8. Other components include 256 bytes of RAM based data memory 3, I/O interface circuitry 4, system interface circuitry 5, and timing and control logic 6. The microcode program for the controller is stored in 2K bytes of RAM based program memory 2. The program memory 2 is connected to the internal 8-bit bus 8 and the system interface 5 through the Program Access multiplexer 7. The nature of the access is determined, as will be discussed, by the particular access mode selected.

The keyboard controller embodiment of the invention is functionally interchangeable and software compatible with the industry standard keyboard controller 8042AH. Object codes written for the 8042AH will run on this controller. Like the 8042AH, and as discussed above, this embodiment is a general purpose 8-bit microcontroller with 256 bytes of data memory and 2K bytes of program memory. However, the main difference between the 8042AH and this embodiment is the utilization of a RAM based program memory architecture rather than the ROM based architecture usually characterizing controller program memory. This embodiment also contains a configuration register and program access logic for facilitating the downloading of a control program at system start-up. The 11-bit program counter allows direct access to every location of the program memory when the program access mode is enabled.

The procedure for modifying a program and downloading it into program memory is a relatively simple scheme which facilitates system integration. The downloading scheme in the PC environment is easily incorporated through the addition of a control bit for selecting between normal operation mode and program access mode for a read or write of the program memory. The PAE (Program Access Enable) bit in the configuration register controls the operation mode of the keyboard controller. When the PAE bit is a "1", the controller is in the normal operation mode. When the PAE bit is a "0", the controller is in the program access mode.

The control program to be downloaded at system start-up is stored in the non-volatile memory which contains the PC boot-up program (i.e., BIOS). The system processor which operates the PC boot-up program is responsible for downloading the control program into the keyboard controller's program memory. In addition to its original functions, the PC boot-up program contains code which will read and/or write to the I/O locations of the keyboard controller. These I/O locations may be the same or substantially the same as the I/O locations used by the system when reading the control program code during normal operation. Another downloading procedure is used for reprogramming the keyboard controller while the system is running.

In the event that the system user desires to modify and download a new microcode program while using the system, the microcode can be downloaded from a number of different memory sources. The code can be contained in nonvolatile memory, the system's main memory (i.e. DRAM), or secondary memory (floppy disks, hard disks, flash memory, CD ROM, etc.). As with the start-up downloading procedure, the system processor is responsible for downloading the microcode into the microcontroller's program memory. The program which accomplishes the downloading can be a firmware program (i.e. BIOS), a system program (i.e. DOS), an application program (i.e. a keyboard enhancer program), or any combination of the three.

The embodiment described herein is merely one embodiment of the present invention, the specifics of which should not be used to limit the scope of the invention. The scope of the invention should be determined by the claims only.

We claim:

1. A keyboard controller for use in a computer system to control and manipulate data passing between a keyboard and a computer system, the keyboard controller comprising:

a central processing unit for controlling and manipulating data passing between the keyboard and the computer system in accordance with a control program;

a program random access memory (program RAM) for receiving and storing the control program;

a bus for transferring data, with the bus being coupled to the keyboard, the central processing unit, and the computer system; and a program access enable unit coupled to the bus, the computer system and the program RAM, with the program access enable unit being selectively set in a first state or a second state so that when the program access enable unit is in the first state the control program is transferred directly from the computer system to the program RAM, without being transferred over the bus, via the program access enable unit, and when the program access enable unit is in the second state data is transferred between the bus and the program RAM via the program access enable unit.

2. The keyboard controller according to claim 1 further comprising a configuration register for selectively setting the program access enable unit to the first state or the second state.

3. The keyboard controller according to claim 2 wherein at the time of start up of the computer system the configuration register sets the program access enable unit to the first state and the control program is transferred from the computer system to the program RAM.

4. The keyboard controller according to claim 2 wherein at a time subsequent to start up of the computer system the configuration register sets the program access enable unit to the first state and the control program is transferred from the computer system to the program RAM.

5. The keyboard controller according to claim 1 wherein the control program transferred from the computer system to the program RAM is supplied from a boot up program stored in the computer system.

6. The keyboard controller according to claim 1 wherein the control program transferred from the computer system to the program RAM is supplied from a system program stored in the computer system.

7. The keyboard controller according to claim 1 wherein the control program transferred from the computer system to the program RAM is supplied from an application program stored in the computer system.

8. The keyboard controller according to claim 1 wherein the control program transferred from the computer system to the program RAM is supplied from a main memory of the computer system.

9. The keyboard controller according to claim 1 wherein the control program transferred from the computer system to the program RAM is supplied from a secondary memory of the computer system.

10. A method of performing keyboard control for the control and manipulation of data passing between a keyboard and a computer system, the method comprising the steps of:

setting a program access enable unit to a first state;

transferring a control program directly from the computer system to a program random access memory (program RAM) via the program access enable unit while the program access enable unit is in the first state;

setting the program access enable unit to a second state after the control program has been transferred to the program RAM; and controlling and manipulating data transferred over a bus between the keyboard and the computer system by a central processing unit which is coupled to the bus, with the central processing unit operating according to the control program in the program RAM.

* * * * *